8103X
M. Otis
Making Cut-Nails,
Patented Mar. 20, 1834.
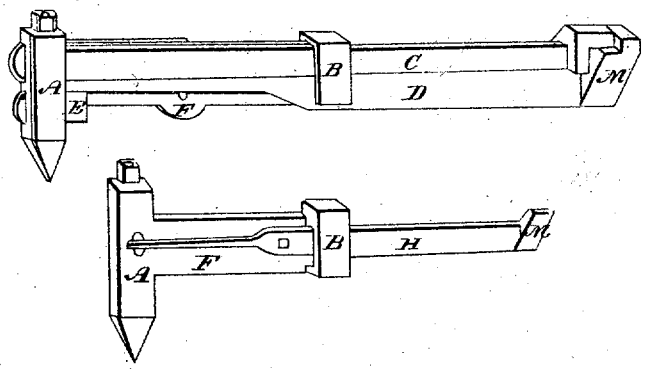

8103X

Melville Otis, East Bridgewater, Mass.

Letters Patent.

The Schedule referred to in these Letters Patent and making
part of the same, containing a description in the words of the said
Melville Otis, himself of his improvement in the Machine for making cut
nails at one operation.

Be it known that I Melville Otis of East Bridgewater in the County
of Plymouth and Commonwealth of Massachusetts, have invented, con-
structed, and applied to use a new and useful improvement in the ma-
chine for making cut nails at one operation, which Machine and im-
provement are here described and specified as follows. viz:

The Machine is made of Cast iron, except when otherwise hereinafter
mentioned, and consists of various complex parts called respectively the
Bed frame and posts. The head block. the cutting saw - the heading lever, the
griping lever. the spindle - the crank staff: the balance wheel; the nipper
and the spring nipper. The Bed frame is the foundation of the Machine
and supports all the other parts. It is of a regular form, and consists of
outside sills and 5 external and one internal right angle. The lengths of
the sills, beginning at the front, on which the head block stands and going
round at the left are successively as follows to wit; 25-28-17-13½-8 and
11½ inches, and the thickness of the sills 3 inches, except the back sill which is
4; and the width 3½ inches, except the front, which is 5, and the back one
which is 3 inches. On the back side of the frame, there are two upright posts
18, inches high, 6 wide and two thick. The narrow sides of the posts are per-
pendicularly in a line with the back side of the 17 inch sill and their wide
sides at a right angle with the same side and distant ½ an inch from its
ends - Centrally in the upper end of each post, there is a cavity 3½ inches
deep and 3½ wide, on the 28 and 11½ inch sills, there are two short posts each
7 inches high 2½ wide and in thickness corresponding with the width
of the sills. The head block, is an upright piece of iron rising from
the the front or 25 inch sill of the frame, and distant at its centre 9½ inches
from the 38 inch sill. It is 6½ inches long, 6 wide, and 4½ high on its front
side and on the opposite side next to the cutting saw 4 inches high to a
cavity in the top of the block. This cavity is in the form of a long square and
is two inches wide 1½ deep, and extends from its opening next to the
cutting saw 5 inches towards the opposite side. Within this cavity on
the side next to the heading set is placed a cast steel griping die 5 inches
long - 3/4 wide and 5/8 thick, having a groove in the end next to cutting saw,
adapted to receive the thick end or head part of the nail - and on the oppo-
site side of the cavity, a piece of wrought iron, faced with steel at the open end,
called the back piece sufficiently wide and long with the die to fill the
diameter of the cavity at the bottom - The steeled end of the back piece on the
lower part has a shoulder or notch in a line with the groove in the die, into
which and the groove in the die, the nail is brought to receive its head.
The die and back piece are adjusted and kept in their places by means
of two iron screws passing through the end of the block, one upon the end of
the die, and the other on the end of the back piece, and by another screw
through the side of the block upon the side of the die. immediately over the die
and back piece, there is placed a steel cutting knife, resembling in form a
plane iron, having its edge grooved a little to conform to the circular motion
of the knife in the cutting saw. one side of the knife is fitted to a groove in the
block, and the other on its upper part is beveled, by means of which and 3
screws - 2 passing through the side of the block, at a right angle upon the be-
veled part of the knife and the other through the end of the block upon the
end of the end of the knife that instument is held firmly in its place, and the
relative position of its cutting edge with that of the knife in the cutting saw
regulated, as the knife is thinest on its beveled side, and from thence it
gradually increases in thickness through its upper surface to the
opposite side, its cutting edge is not exactly in a horizontal line, but forms
a slightly inclined plane from its highest part nearest the heading set.
On the top of the head block at the right of the right of the knife, there is a
wrought iron plate called a guard, 6 inches long 1¾ wide in the centre,
and tapering from thence to ½ an inch at each end, having on the sides of
the

6

8103X in the block of the requisite size, made to receive an instrument called the spring gauge. The groove opens into the cavity of the block and terminates in the upper part at a small hole, made in a line with the groove through the top of the block. An iron or steel bolt about 1 inch and 1/4 long is inserted and fastened in the hole, having at its lower end, where it enters the groove, a mortise, into which the upper and flattened end of the spring gauge is inserted and pinned horizontally, so as to form there a movable joint. The gauge, made of steel, is ½ an inch wide and 3/16 thick. In the line of its length, it corresponds in form with the back side of the knife and its bevelled edges. Its lower end extends a little below the edge of the knife, and is there seen, having its front side nearly in a line with the upright front side of the knife. With this gauge are connected a spring, screwed on the back side of the block, and a small cylindrical rod, which extends from the spring through a hole in the block, directly upon the back of the gauge. When the Machine is at work, as soon as the nail is cut, the spring presses the rod against the gauge, by which means the gauge is made to bear against the nail and hold it securely till it is brought down and carried into the die and shoulder of the back piece.

<u>The heading lever</u>, has a plate nearly horizontal when at rest 24 inches long - 6 wide and 2 thick - terminating at each end within its length on the side next to the head block, in a projection or arm at a right angle with the plate 4 inches long - 3 wide and 2 thick. The ends of the arms are circular and on their lower sides extend so far below the line of the under side of the plate, as to have a vertical diameter of 3½ inches. Through the centre of each end, a gudgeon or centre passes horizontally, one into a socket in the front side of the head block 3/8 of an inch above the line of its junction with the bed frame, and the other into a socket, in the semicircular projection from the upper side of the middle sill of the bed frame 1/4 of an inch above the line between the projection and sill. The centres are made fast and adjusted in the same way as those on the cutting saw shaft, and are so placed relatively to other parts of the Machine, as that a line drawn perpendicularly from a point between the heading set and the griping dies when brought together, will fall upon and intersect a right line between them centrally [illegible]

on the the plate next to the knife a perpendicular piece of faced steel, extend-
-ing to the end of the plate next the cutting saw - 1½ inch square and ¼
of an inch thick. This guard is screwed through the centre of the plate
to the block, and is designed to regulate the length of that part of the nail
which is to be left without the dies and which is to form the head of
the nail. <u>The cutting saw</u> so called, perhaps, from the resemblance of its
motion to that of the human saw, has an irregular horizontal shaft connected
at a right angle with the arm or lever, from which it receives its motion.
The shaft at each end is supported by and turns upon a wrought iron
or steel gudgeon or centre, which passes horizontally through one of the
short posts in the bed frame, at the same height from the frame as the
groove in the griping dies, and enters a socket made to receive it in the
end of the shaft. The centres are pressed into the sockets and retained therein
by screws; one operating vertically through the top of the post upon the
side of the centre and the other through a guard and thence upon the end
of the centre. On the upper side of the shaft at about 2/3 of its length from
the lever and opposite to the head block, a block rises about 7 inches above
the axis of motion, and immediately over that part of the shaft which
has a recess upwards to give room for a portion of the griping lever.
This block has on its front side a cavity resembling in form that in the
head block, within which is placed a moving cutting knife of the same
general form with that in the head block, about 5/8 of an inch thick and
beveled on the lower part of the back side for about 3/4 of an inch to the
cutting edge. This edge which is on a horizontal line, is about 1/8 of an inch
thick, and forms a slightly acute angle with the front side of the knife.
This knife like the stationary one is made fast in its place, by means of a
groove in one side of the block, and screws upon the side of the knife, on
the other. There is also a screw through the top of the block upon the upper
end of the knife, to press it downwards, as occasion may require.
For the purpose of adjusting properly the cutting edge of this knife, with
that of the knife in the head block there are two screws, which pass
through the lower part of the block from the back side, and screw upon
the lower and back part of the knife. Back of the knife there is a groove
in the on the upper side of the plate, and at a right angle with it is that part of
the heading lever, which may be called the base of the arm. It extends on
its lower part from the outer edge of the plate to a point one inch distant
from the inner edge below which point and edge, it projects downwards
to the under side of the plate. It is 2 inches thick, and 9½ high from its
levelled end between the head block and cutting saw and the point
nearly over the centre of the plate, where it rises into a circular arm. The
line of the under side of the arm is horizontal to the extent of one inch
from its end, and then a quarter circle, described by the sweep of a 6 inch
radius from a centre in a line with the upper surface of the plate and
6 inches from its outer edge. The circular line of its upper side is formed
by the sweep of a 6 inch radius from a centre 3 inches from the same
edge of the plate. That part of the Machine, which presses against the
nail, when griped by the dies, and forms the head, is a cylindrical bar
of steel 5 inches long and 1 inch diameter, and is called the heading
set. This bar is inserted in a groove or bed made for it in upper side of the
base of the lever, and extending a little into the circular arm. It is secured
and regulated by means of a staple passing over the bar, and through holes
drilled in the base of the lever and plate, to the under side, and there rivet=
ed and by a screw through the top of the staple upon the upper side of the
set and another through the lower part of the circular arm, upon its
end. The circular arm of the lever is connected, by means of a toggle with a
projection from the shaft of the cutting saw, made in a line with the
lever of the cutting saw, or with what may be considered a part of that lever
extended beyond the shaft. This toggle is made of bell metal, and is 3 inches
long, 1 inch diameter and has semi globular ends, one end of it is set in
a socket, in the lower side of the circular arm of the lever near its end and
the other in a socket in the upper side of the projection. The arm and pro-
jection are also connected by means of a small iron rod or wire
which passes from the end of the latter and hooks into a cavity on the
top and near the end of the former. This wire is designed to bring back the
heading lever if from any cause its weight should be insufficient for
that purpose. The Griping lever has a shaft placed horizontally be-
tween

81037 between the front and middle sill of the bed frame (its lower side 3/4 of an inch above the lower sides of the sills) moving on gudgeons or centres, through the 28 & 16½ inch sills of the frame. This shaft is 3 inches thick or throughout and 3 inches wide at each end. From the end next to the 28 inch sill, it gradually increases in width, until at the distance of 3½ inches it is ½ an inch wider. It continues of this increased width for 3¼ inches, and thence to the other end, a distance of 11 inches, it gradually decreases to 3 inches. The form of the shaft is such that, that portion of its side next to the head block, whose length is 3½ inches, is parallel with, back of, and ½ an inch distant from a right line between the centres. The base of the lever so called, is on, and coincides with that part of the shaft which is 3½ inches wide. Its height to its top under the recess in the shaft of the cutting saw, is in front 5½ inches, and the line of its top to the arm of the lever the same. The back side of the base to the height of two inches is perpendicular and then, in the form of an arc, of a circle whose radius is 11 inches; the arc terminating at a point perpendicularly under the junction of the top line of the base with the arm of the lever and at 3 inches distance below it. On the side of the base next to the heading lever, there is a rabbit or bed 1 inch deep and wide and 7 long into which is placed a steel griping die, In the end of the die next to the head block, there is a groove to receive the nail corresponding with that in the stationary die. The die is held in place by a wrought iron bolt, which passes over the top of the die and down its outside in the form of a hook and then horizontally through the base of the lever, immediately under the die, to the opposite side, and is there keyed. It is moved forward as occasion may require by a screw upon its end. The arm of the lever to its junction with the base is, on the front side, 18 and on its back side, 19½ inches long. It is 2½ inches thick throughout, 4 inches wide at its junction and 1½ at the top; and is so placed relatively to its base, as that when raised to its greatest extent by the cam, the die in the base will meet the die in the head block in a horizontal line.

The Spindle, is a horizontal shaft, resting and turning in the cavities

81034 cavities of the two upright long posts 35 inches long and 2 square or
within the posts. The parts of the spindle, which turn on the cavities called
necks are cylindrical, and are 3[illegible] inches long and 3 in diameter.
On and near that end of the spindle, which is on the same side of the
Machine as the 13[illegible] inch sill, there is an arm at a right angle with
the spindle 7 inches long (4[illegible] from the centre of the spindle in one
direction, and 2[illegible] in the opposite direction) 1[illegible] inch thick and 3 wide
at the lower end, from whence it gradually diminishes to two
inches at the upper end. At the distance of 2, inches from the end of
the longer portion of the arm and through the centre, there, of its wide
side, an iron bolt 3[illegible] inches long and [illegible] inch in diameter is inserted
one end of which passes into an orifice made for the purpose between
the boxes, in the upper end of the crank staff. The bolt is made fast by a
screw upon its side through the end of the arm. At 5 inches distant from
the neck of the spindle nearest to the aforesaid arm is placed the
cam of the griping lever. This cam may be constructed by the following
rule, to wit: With a three inch radius describe a circle, an arc of 90,
degrees of this circle will form one portion of the cam. From a
point in the centre of the end of this arc, extends a line through the
centre of the circle, and one inch and a half beyond. Then if a circle
be formed, so as to pass through the end of the arc, and the end of the
extended line it will exhibit the form of the other and larger portion
of the cam. When the spindle turns, supposing the bolt in the aforesaid arm
to be directly above the axis of motion, the bolt descends towards the heading lever
and when it has passed [illegible] an inch below a line horizontal to the axis of motion,
the end of the griping lever is raised by the cam on the spindle to its greatest extent,
at 3 inches distant from this cam is the nipper cam 1[illegible] inch thick. It is so formed
so that in operating on other parts of the Machine hereafter to be described, the
spring nipper is applied to the nail as soon as the knife has carried it down
to its lowest point, and holds it until it is griped by the dies.

The crank staff, is made of wrought iron - is 18[illegible] inches long [illegible] thick
and 1[illegible] wide to within 4[illegible] inches of the ends where it is 3[illegible] inches
wide and 1[illegible] thick - within each end there is a cavity 2[illegible] inches
long

8103X long and 1¼ wide, into which 2 composition boxes are placed.
These boxes have a bed between them into which on the upper end
of the staff the bolt from the arm of the spindle is inserted and on
the lower end a similar bolt from the lever of the cutting saw.
The balance wheel, is 30 inches in diameter, its rim 3 inches broad
and 1½ thick. It has a hub 6 inches in diameter and 2 thick, and 4
arms each 2 inches wide at the junction with the hub and 1½ at
the junction with the rim. The wheel is placed on the outer side of
one of the high posts ½ an inch distant from it and hangs upon,
and is confined on, one end of the spindle, which is made to
pass through its hub, and 6 inches beyond it into a pulley.
The Nipper, resembles in form a crane iron. Its post is on the
28 inch sill of the bedframe, near the shaft post, through which
a center of the cutting saw passes and on that side of it nearest to the
front side of the frame. The bottom of the post has a conical
point, which enters and moves in a conical socket in the side, and
its top a conical socket into which a conical screw enters through
one end of a cap, which at the other end is fastened on the top of the
short post. The arm of the nipper extends horizontally from its in-
sertion in its post to the spring gauge leaving nearly sufficient
room between them to admit of their moving freely by each other,
without touching. It is made of steel and is one inch wide at its in-
sertion and gradually tapers to ½ an inch next to the gauge. Its
thickness is ⅛ of an inch. The upper side of the arm next to the
gauge has a perpendicular projection upwards ½ an inch square
and ⅛ of an inch thick. The nipper arm is so placed in its post,
as that this projecting part of it may pass directly under the small
prominent part of the back piece. The nipper is moved by means
of a small iron rod or wire, whose ends are in the form of a
tenon inserted loosely, one into the nipper arm at about 3 inches
from the nipper post, and the other into the lower end of the
nipper lever. The nipper lever is ⅜ of an inch square and extends
perpendicularly from the back side of the spindle where it is in
contact

8103X could act with the nipper cam, to the upper surface, without touching of the back sill of the bed frame. Its centre of motion is at 9 inches distance from the top of the lever, where it is crossed at a right angle by a bar 3/4 of an inch square, extending from one high post to the other. The lever and bar are supported by and turn upon conically pointed screws through the sides of the posts passing into conical sockets in the ends of the bar. For the purpose of bringing back the nipper after it has been carried forward by the motion of its cam, a wire may be attached to the nipper arm, and extended under the cutting saw to a spring fastened to the high post near the balance wheel.

<u>The Spring Nipper</u>, consists of a straight bar of steel, inserted and secured at one end in the Nipper post, directly over the Nipper arm, and extending from thence horizontally to the projecting part of the nipper. At its insertion it is 3/8 of an inch square and from thence gradually enlarges to 1/4 of an inch at the opposite end. At this end, it should be so far forward of the Nipper as to perform its office of turning the nail into the die and shoulder of the back piece, before the projecting part of the nipper comes in contact with the nail.

If preferred the nail spring nipper may be attached to the broad side of the Nipper arm near the Nipper post by screws or rivets through a part of the spring nipper, sufficiently enlarged to receive them and extended from thence nearly horizontally to the end of the nipper, at the same distance forward of it as was required in the preceding mode. So much of the end of the spring nipper on its upper corner next to the projecting part of the nipper as is equal in length to that projecting part, is beviled. When this mode of placing the spring nipper is adopted, the projecting part of the Nipper is bent forward to conform to the beviled corner of the spring nipper. Should the spring nipper from any cause meet with an unusual resistance in turning the nail, this bent part of the Nipper is designed to press on the beviled corner of the spring nipper, and so change the direction of its motion as to cause it to perform its office properly. In both modes the relative positions of the nippers

8103X nippers is regulated by a small guard attached to the nipper arm.

The improvement which I claim as my invention consists in adding to the Machine heretofore in use, an instrument which I have called the Spring Nipper; by means of which the nail is turned into the die and shoulder of the back piece, in the manner hereinafter described, so as to be griped by the dies on its flat sides instead of the edges. without the spring nipper the operation of the Machine is as follows. The nail is cut from head to point by a continued action of the knives on the plate in the Manner of Shears. It is then carried down under the edge of the moving knife, against the upper part of the stationary die, and back piece, on one side side and the spring gauge, on the other, until its upper side is in a line with the upper side of the shoulder of the back piece. It is then carried forward by the spring gauge into the die and shoulder of the back piece, and there held by the pressure of the nipper until its edges are griped by the dies. The heading set then meets the end of the nail and forms its head by pressure. With the spring nipper, the operation is as follows. The nail is cut and brought down as before mentioned to a point where a horizontal line through the centre of the nail from edge to edge will be below the corner of the back piece. The spring nipper moving in a line also below the corner of the back piece then meets the nail on the edge opposite to the back piece and by constantly and steadily pressing it against the corner of the back piece, which in this instance acts as a hinge or centre of motion the nail is turned one fourth of a circle into the die and shoulder of the back piece, and then griped by the dies on its fl[illegible]t sides, It is then headed as before mentioned.

In testimony that the preceding is a true specification of the said machine and my improvements therein, I have hereunto set my hand, at East Bridgewater aforesaid this eighth day of January A. D. Eighteen hundred and thirty four.

Melville Otis

Witnesses
Aaron Hobart
John S. Champney

Drawing

4957 [illegible] (Patented [illegible] 1830)